United States Patent [19]
Yokota

[11] 3,958,420
[45] May 25, 1976

[54] AIR EXTRACTING SYSTEM FOR HYDRAULIC STEERING APPARATUS

[75] Inventor: Nobutoshi Yokota, Kobe, Japan

[73] Assignee: OHJI Seiki Kogyo Kabushiki Kaisha, Kobe, Japan

[22] Filed: Apr. 16, 1975

[21] Appl. No.: 568,584

[30] Foreign Application Priority Data
Oct. 16, 1974  Japan.................. 49-124660[U]

[52] U.S. Cl.................................... 60/453; 60/464; 60/478; 60/477
[51] Int. Cl.² ......................................... F15B 21/04
[58] Field of Search ............ 60/386, 402, 453, 464, 60/477, 478

[56] References Cited
UNITED STATES PATENTS
| | | | |
|---|---|---|---|
| 2,020,951 | 11/1935 | Lemon................................ | 60/386 |
| 3,060,688 | 10/1962 | Gondek............................ | 60/477 X |
| 3,157,478 | 11/1964 | Edwards............................. | 60/453 X |

Primary Examiner—Edgar W. Geoghegan
Attorney, Agent, or Firm—Wenderoth, Lind & Ponack

[57] ABSTRACT

An air extracting system for a hydraulic steering apparatus which has a pump, a reservoir and a piston-cylinder mechanism which is geared to the steering gear. A two-position changeover valve is positioned in the hydraulic circuit between the pump and the piston cylinder mechanism, which in one position connects them in a closed circuit and in the other position connects the return portion of the hydraulic circuit to the reservoir. The piston has a bore therethrough with a two way check valve therein with a check valve opening element which opens the check valve at the end of the stroke of the piston. When the changeover valve is positioned to connect the return of the hydraulic circuit to the reservoir, when the piston reaches the end of its stroke, the check valve is opened to cause air in the system to pass through the check valve and through the changeover valve to the reservoir.

2 Claims, 4 Drawing Figures

AIR EXTRACTING SYSTEM FOR HYDRAULIC STEERING APPARATUS

BACKGROUND OF THE INVENTION

This invention relates to an air extracting device for efficiently extracting air quickly and completely from a hydraulic circuit in a closed circuit hydraulic steering apparatus.

OBJECT AND BRIEF SUMMARY OF THE INVENTION

A principal object of the present invention is to provide a system for facilitating quick extraction of air from a hydraulic steering apparatus merely by incorporating a change-over valve into a generator.

To this end, the system comprises a pump, a reservoir and a piston-cylinder mechanism which is geared to the steering gear. A two-position changeover valve is positioned in the hydraulic circuit between the pump and the piston-cylinder mechanism which in one position connects them in a closed circuit and in the other position connects the return portion of the hydraulic circuit to the reservoir. This piston has a bore therethrough with a two way check valve therein with a check valve opening element which opens the check valve at the end of the stroke of the piston. When the changeover valve is positioned to connect the return of the hydraulic circuit to the reservoir, when the piston reaches the end of its stroke, the check valve is opened to cause air in the system to pass through the check valve and through the changeover valve to the reservoir.

BRIEF EXPLANATION OF THE DRAWINGS

The invention will be better understood from the following description taken in connection with the accompanying drawings, in which.

DETAILED DESCRIPTION OF THE INVENTION

Figure 1:
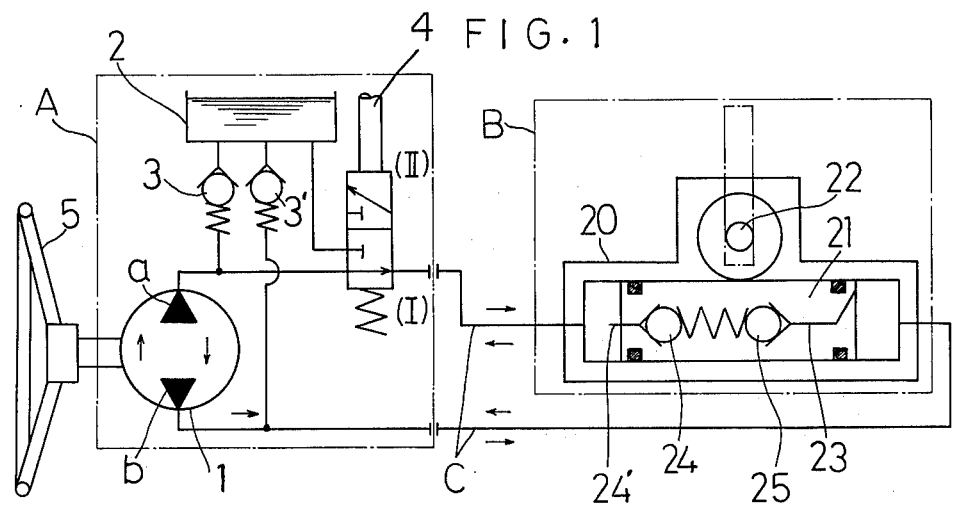
FIGS. 1 and 2 are piping system diagrams illustrating the function of an embodiment of this invention as applied to a system having a radial piston type hydraulic pump as a generator in different operation conditions.

FIG. 1 is a piping system diagram incorporating the device of this invention in which a generator A is connected to a driven unit B by a piping C to form a closed circuit.

Figure 2:
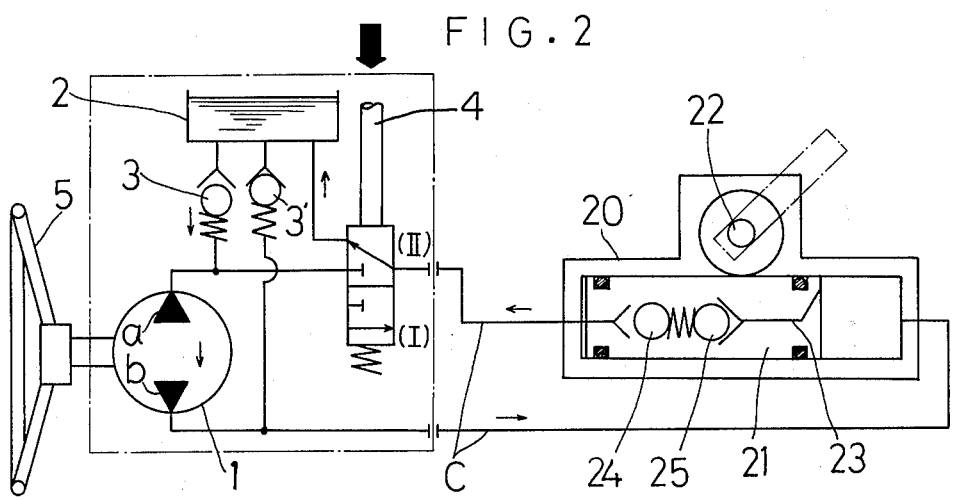

In FIG. 1, a radial piston type pump 1 is connected to an oil reservoir 2 through check valves 3 and 3' provided in oil passages which supply oil from the oil reservoir 2 to the pump. A manual change-over valve 4 is incorporated in the generator A for controlling flow in the piping C connecting the generator A with the driven unit B. In position I, changeover valve 4 completes a closed circuit through the valve, as shown in FIG. 1, and in position II completes an open circuit through a valving section II, as shown in FIG. 2. A steering wheel 5 is connected to the rotor of the plunger pump. In the driven unit B, a cylinder 20 has a piston 21 slidable therein to the left or right by the hydraulic pressure supplied from the generator A. A steering shaft 22 is rotated by the left and right movement of the piston 21 through gearing (not shown) on a part of a peripheral surface of the piston 21 with a gear portion (not shown) on the shaft. A bore 23 extends through the body of the piston 21. The right end of the bore 23 is illustrated schematically as extending obliquely upward in order to show that an open end of the bore is to be provided at an upper part of the piston end since bubbles tend to gather at an upper part of the oil chamber at a time when the air extracting action described hereinafter is carried out. Check valves 24 and 25 are provided in bore 23 which are operated in the opposite direction from each other. The check valve 24 is designed to be automatically operated by the action of the valve stem 24' which projects from the left end of the piston when the piston reaches the left end of its stroke to open a valve port thereof.

It is, of course, possible to place the check valve structure on the right side, with the upwardly sloped end of the bore 23 on the left side, and to let the valve stem of the check valve 25 project outward from the right end of the piston, thus forming a bilaterally reverse circuit.

In the condition shown in FIG. 1, in which the changeover valve is positioned to form the closed circuit, when the rotor of the pump 1 is rotated by the steering wheel 5 in the clockwise or counterclockwise direction, hydraulic fluid is sucked from the oil reservoir 2 through either check valve 3 or 3', and is sent to the driven unit B from either port a or b to cause a left or right movement of the piston 21 of the driven unit B, thereby imparting clockwise or counterclockwise rotation of the steering shaft 22.

FIG. 2 shows the operational condition of the steering apparatus, in which the changeover valve 4 is shifted to change the closed circuit shown in FIG. 1 into an open circuit through the valving section II, the same numerical symbols being applied to the same members as in FIG. 1.

When the hand wheel 5 continues to be rotated in a direction such that the hydraulic fluid is sucked from the reservoir 2, supplied to the port a and delivered from port b, the fluid enters the cylinder 20 from the right end to cause leftward sliding motion of the piston 21. At a moment when the piston 21 reaches the end of the leftward stroke, the valve stem 24' of the check valve 24 strikes against the left end wall of the cylinder 20 to open the valve port, so that air in the piping C is caused to flow toward the reservoir 2 through the bore 23. Thus, the air in the system can be easily extracted.

Figure 3:
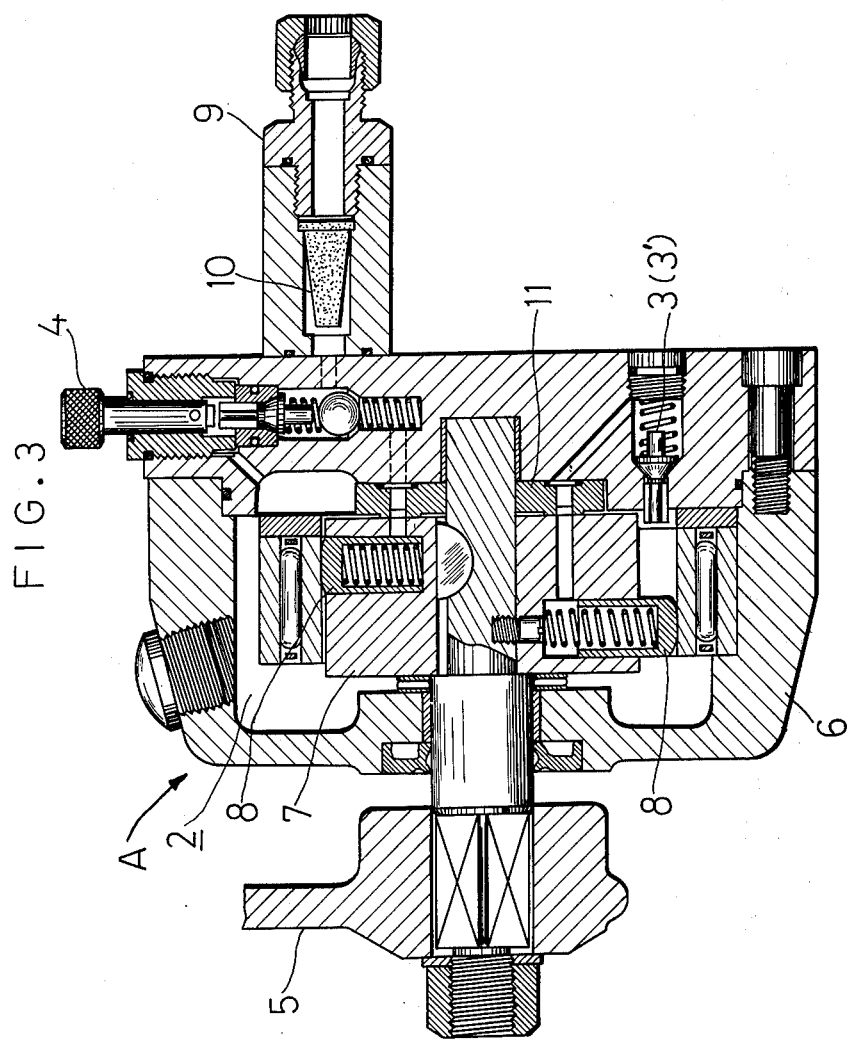
FIG. 3 is a vertical sectional view showing the construction of the assembled generator.
Figure 4:
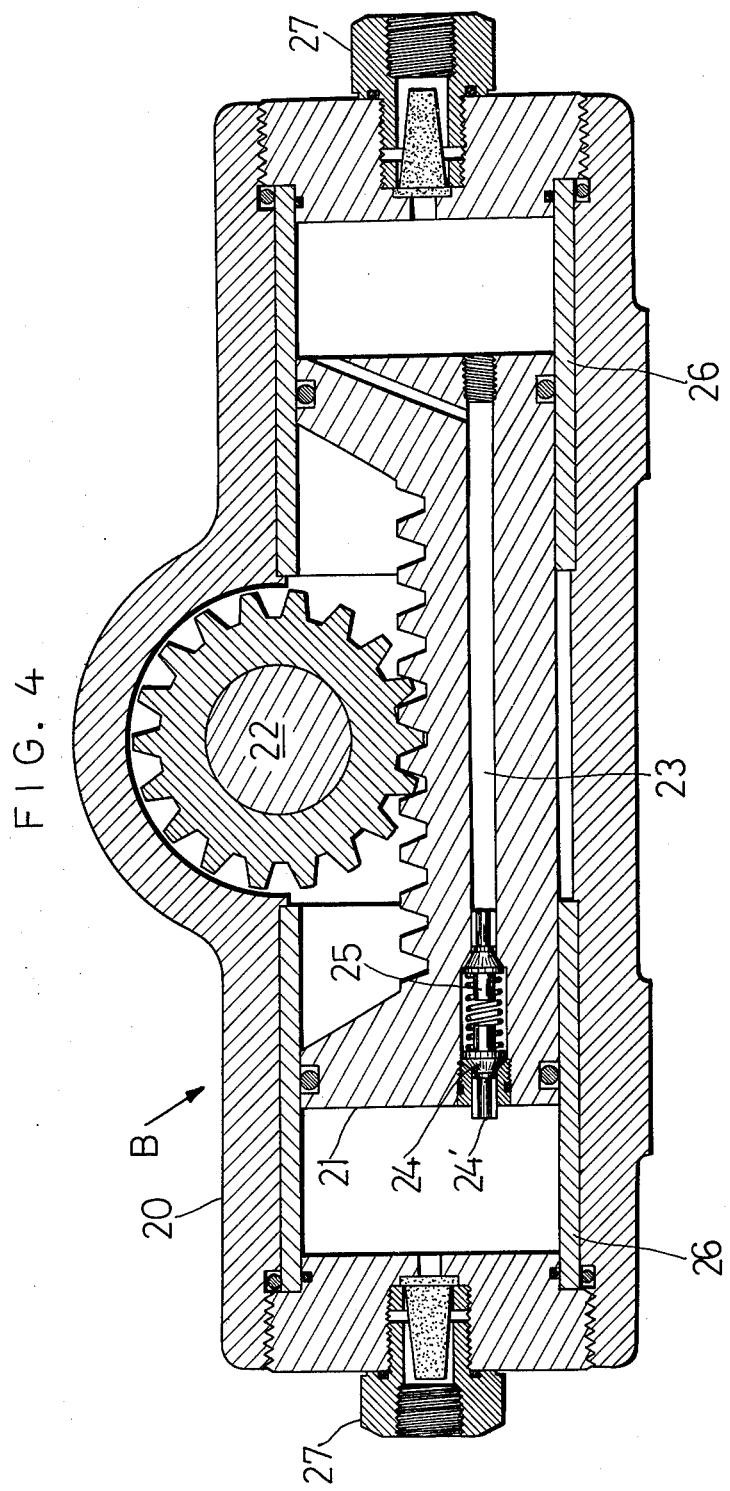
FIG. 4 is a vertical sectional view showing an embodiment of the construction of the assembled driven unit.

FIG. 3 shows a practical embodiment of the construction of the generator A in accordance with this invention as described above, and FIG. 4 shows an embodiment of the construction of the driven unit B. The members corresponding to the members in FIGS. 1 and 2 have the same numbers in these figures. Further, in FIG. 3 there is shown a pump casing 6 and a pump rotor 7 having plungers 8 which are radially positioned relative to the rotor axis in two rows. A pipe joint 9, a filter 10, and a distributor plate 11 are also shown. Finally, in FIG. 4, 26 is a liner fitted in the cylinder 20, and 27 is a pipe joint.

What is claimed is:

1. In a hydraulic steering apparatus having a pump means for pumping hydraulic fluid in response to the operation of a steering wheel, a piston-cylinder means having a piston moved in opposite directions and coupled to a steering mechanism for actuating the steering mechanism when the piston is moved, the piston-cylinder means being hydraulically coupled to the pump means, and a reservoir coupled to said pump means, the improvement comprising an air extracting system comprised of a changeover valve coupled between the pump means and the piston-cylinder means for coupling the pump means and the piston-cylinder means in a closed hydraulic circuit when the changeover valve is in one position, and for coupling the pump means to one end of the piston-cylinder means and coupling the other end of the piston-cylinder means to the reservoir when the changeover valve is in the other position, said piston having a bore therethrough from end to end, and two way check valve means in said bore, said check valve means having valve opening means for opening the portion of said check valve means blocking flow through said bore toward said other end of said piston when said piston reaches the end of its stroke toward said other end of said piston-cylinder means, whereby when the changeover valve is in said other position, the opening of said check valve means at the end of the stroke of the piston toward said other end of the piston-cylinder means permits air to be extracted from the piston-cylinder means and directed to the reservoir.

2. The improvement as claimed in claim 1 in which the piston-cylinder means is horizontal and the end of said bore at said one end of said piston is adjacent the top of the piston-cylinder means.

* * * * *